United States Patent Office 3,395,121
Patented July 30, 1968

3,395,121
CURING EPOXY RESINS WITH BORON TRICHLORIDE-TERTIARY AMINE COMPLEXES
John R. Pfann, Scotch Plains, and Adam F. Kopacki, Westwood, N.J., assignors to Stauffer Chemical Company, New York, N.Y., a corporation of Delaware
No Drawing. Filed Sept. 21, 1966, Ser. No. 580,885
5 Claims. (Cl. 260—47)

The present invention relates to epoxy resin compositions containing as a latent curing agent boron trichloride/tertiary amine complexes.

The epoxy resins are generally liquid, thermoplastic resins when in their pure state. These resins, however, are converted to the cross-linked or cured state by heating them in the presence of a curing catalyst. Catalysts which have been proposed heretofore have included primary, secondary or tertiary amines, various Friedel-Crafts catalysts, organic and inorganic acids and anhydrides, alkali metal hydroxides, and the like. These catalysts, however, generally promote extremely rapid curing and preclude the addition of these catalysts to the resin compositions except when the resin is to be used immediately. More recently it has been proposed to utilize boron trifluoride/amine complex curing agents. These amine complex curing agents are advantageous in that they provide exceptionally long storage-life to the epoxy resin compositions. Unfortunately, however, these catalysts do not provide long pot-life, i.e., long storage-life at temperatures below the curing temperature but above ambient temperature. These curing agents are also hydrolytically unstable and break down in the presence of water or moisture to give insoluble decomposition products which show up in the resin composition as specks and reduce the amount of effective catalyst available. Boron trichloride/monomethyl amine complex has also been proposed and evaluated. Epoxy compositions containing this curing agent, however, require a period of about 18 hours at 200° C. to effect cure and are, therefore, not practical for commercial utilization.

It has now been found, however, in accordance with this invention that epoxy resin compositions containing a catalytic amount of a boron trichloride/tertiary alkyl amine catalyst exhibit exceptionally long pot-life at elevated temperatures, relatively short curing times at curing temperatures, long storage-life, and relatively high hydrolytic stability thereby overcoming the major deficiencies in the compositions proposed heretofore.

By the term epoxy resin is meant any polymerizable monomeric or pre-polymeric compound containing at least two epoxide groups and having a molecular weight of at least 150, and preferably 300 and higher. The most widely used epoxy resins are those formed from the reaction of epichlorohydrin and a dihydric phenol, such as bisphenol A. Other epoxy resins which can be used in the present invention include those which are based upon epoxy cyclic structures, i.e., those containing the cyclohexyl moiety as represented by (3,4-epoxy-6-methylcyclohexylmethyl-3,4-epoxy - 6 - methylcyclohexane carboxylate); also included are glycidyl compounds containing organo silicon moieties as represented by 1,3-bis [3-(2,3-epoxy-propoxy)propyl] tetramethyl disiloxane. Other commercial epoxy resins include glycidyl ethers of glycerol, glycidyl ethers of bisphenol F, glycidyl ethers of tetrakis (hydroxy phenyl) ethane and epoxylated novalac resins.

The commercial epoxy resins generally have an epoxide equivalent in excess of 140. These resins are all well known in the art and accordingly do not require elaborate discussion here. The curing agents of the present invention can be used with any and all of the aforesaid epoxy resins. The tertiary alkyl amines which are useful in the preparation of the boron trichloride/amine complexes of this invention are represented by Formula I below:

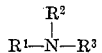

wherein $R^1$, $R^2$ and $R^3$ are alkyl groups containing from 1 to 4 carbon atoms inclusive, such as methyl, ethyl, propyl and butyl. The most preferred tertiary alkyl amine for use in the present invention is trimethyl amine.

The boron trichloride/trialkyl amine complexes are readily prepared by simply admixing boron trichloride and the desired trialkyl amine. This addition can be conducted in an inert solvent or diluent, if desired, provided the said solvent neither reacts nor complexes with either the amine or the boron trichloride reactant. Similarly, this reaction is readily conducted at ambient temperature although, if desired, temperatures in the range of from about 0° C. to about 40° C. can be conveniently used. The boron trichloride is reacted with the trimethyl amine preferably in stoichiometric amounts.

The amount of curing agent which is used in the epoxy resin compositions of this invention is a catalytic amount which is generally from about 0.5 to about 10 parts per hundred parts epoxy resins by weight. A preferred amount, however, is from about 1 part to about 3 parts by weight per hundred parts resins. The curing agent is added to the epoxy resin and blended throughout. This resin composition containing a latent curing agent remains stable almost indefinitely at room temperature, yet cures readily at elevated temperatures generally in the range of from above 100° C. to about 200° C. depending on the particular epoxy resin used. Conveniently temperatures of from 120° C. to 160° C. can be used to cure the catalyst resin system. The examples which follow serve to illustrate the present invention.

Example 1

Three parts of boron trichloride trimethyl amine addition compound were mixed with 100 parts of a commercial epoxy resin, i.e., Epon 828® (registered trademark of Shell Chemical), a reaction product of bisphenol A and epichlorohydrin. The mixing was conducted in a high speed blender at a temperature of about 85° C. until solution was complete. By way of comparison, the composition of boron trifluoride monoethyl amine addition compound and the same epoxy resin were blended in the same proportion. It should be noted that the boron trifluoride monoethyl amine addition compound is one which is commercially available and has been found to represent the optimum boron trifluoride/amine addition epoxy curing agents. It, therefore, provides a stringent comparison. Pot-life of each of these compositions was determined at 25° C., 48.8° C. and 65.5° C. for compositions containing 1, 2 and 3 parts of the boron addition compound per hundred parts of the epoxy resin. The results of these evaluations are set forth in Table I below:

TABLE I

| Boron Compound | BCl₃-TMA | | | | | | | | | BF₃-MEA | | | | | | | | |
|---|---|---|---|---|---|---|---|---|---|---|---|---|---|---|---|---|---|---|
| Loading of boron compound | 1 | | | 2 | | | 3 | | | 1 | | | 2 | | | 3 | | |
| Temperature, °C | A | B | C | A | B | C | A | B | C | A | B | C | A | B | C | A | B | C |
| Days to reach 10³ centipoises | 735 | 735 | 733 | 735 | 733 | 733 | 735 | 735 | 733 | 735 | 735 | ___ | 735 | 22 | 7 | 735 | 18 | 7 |

NOTE.—A, 25° C.; B, 48.8° C.; C, 65.5° C.

The relative cure-rates for resins containing each complex, each at 3 parts per 100 parts resin, were measured at temperatures of 120° C. and 150° C. Compositions containing the boron trifluoride/monoethyl amine addition product cured in 50 minutes at 120° C. as compared with 130 minutes for the boron trichloride trimethyl amine additive. At 150° C. the boron trichloride monoethyl amine resin composition cured in 4 minutes. The boron trichloride trimethyl amine cured in 6 minutes. Gelation time, peak exotherm, peak time, color, transparency and degree of cure were also determined for these compositions and are set forth in Table II below:

TABLE II

| | Epon 828–BCl₃·TMA | Epon 828–BF₃·MEA |
|---|---|---|
| Gelation time, minutes | 3 | 2 |
| Peak exotherm, °C | 165 | 178 |
| Peak time, minutes | 6 | 4 |
| Color, after curing | (¹) | (²) |
| Transparency | (³) | (³) |
| Degree of cure | (⁴) | (⁴) |

¹ Straw.  ² Honey.  ³ Clear.  ⁴ Slight hard tack.

In a similar manner epoxy resins containing the addition products of boron trichloride triethyl amine, tripropyl amine and tributyl amine respectively are evaluated. These addition products provide substantially similar properties. Boron trifluoride monoethyl amine is highly soluble in water and in fact will pick up water readily on exposure to moist air. In comparison, boron trichloride, trimethyl amine is hydrolytically stable at ambient temperature and humidity. It hydrolyzes very slowly even in boiling water and in the presence of a small amount of base.

Oven stability tests conducted on comparative examples of epoxy resins containing 2 parts per hundred resin boron trifluoride·mono-ethyl amine and 3 parts per hundred resin boron trichloride·trimethyl amine indicated that the sample containing boron trifluoride·mono-ethyl amine turned dark yellow and had gelled after a period of two months. The composition containing boron trichloride·trimethyl amine was still liquid and showed substantially no color change in six months.

Torsion pendulum evaluations indicated that the epoxy resin cured with BCl₃·TMA was less brittle than that cured with BF₃·MEA.

The compositions of this invention are useful as coating compositions, molding compositions, in potting and encapsulation applications and as adhesive compositions.

It is to be understood that the compositions of this invention can contain such other ingredients as are normally incorporated in epoxy resin formulations to fulfill a particular function. Such additives include, but are not limited to, pigments, dyes, fillers, extenders, antioxidants, heat and light stabilizers, plasticizers, diluents, solvents, lubricants, viscosity regulators, and the like.

One of the most distinctive, advantageous properties of the boron trichloride catalysts of this invention over the boron trifluoride catalysts known to the art is that they do not cause the etching of glass. This is extremely important both in the preparation of the catalyst as well as resin formulations, but also in respect to resin applications for use with fiberglass such as pre-preg manufacture and filament winding.

These catalysts also find utility in molding powders providing epoxy compositions with exceptional shelf life.

What is claimed is:

1. A heat curable resinous composition comprising an epoxy resin having a molecular weight of at least 150 and having a plurality of 1,2-epoxide groups and a catalytic amount of the addition product of boron trichloride and a trialkyl amine of the formula:

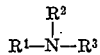

wherein $R^1$, $R^2$, and $R^3$ are alkyl groups containing from 1 to 4 carbon atoms inclusive.

2. The composition of claim 1 wherein $R^1$, $R^2$ and $R^3$ are methyl groups.

3. The composition of claim 1 wherein the boron trichloride/trialkyl amine addition product is present in an amount of from 1 to 3 parts per hundred parts epoxy resin by weight.

4. The composition of claim 1 wherein the epoxy resin is a reaction product of epichlorohydrin and a dihydric phenol.

5. The composition of claim 1 wherein the epoxy resin is the reaction product of epichlorohydrin and bisphenol A.

References Cited

UNITED STATES PATENTS 2,909,494  10/1959  Parry et al.

WILLIAM H. SHORT, *Primary Examiner.*

T. D. KERWIN, *Assistant Examiner.*